United States Patent
Davis et al.

(10) Patent No.: US 6,634,472 B1
(45) Date of Patent: Oct. 21, 2003

(54) TUNED MASS DAMPER WITH TRANSLATIONAL AXIS DAMPING

(76) Inventors: Toren S. Davis, 8932 W. Tierra Buena, Peoria, AZ (US) 85382; David R. Koehler, 9316 W. San Miguel Ave., Glendale, AZ (US) 85305; James H. Boyd, 4112 W. Rancho Dr., Phoenix, AZ (US) 85308

( * ) Notice: Subject to any disclaimer, the term of this patent is extended or adjusted under 35 U.S.C. 154(b) by 67 days.

(21) Appl. No.: 10/115,387

(22) Filed: Apr. 3, 2002

(51) Int. Cl.$^7$ .................................................. F16F 7/10
(52) U.S. Cl. ........................................ 188/378; 188/379
(58) Field of Search .................................. 188/298, 378, 188/379, 380; 267/122, 136, 226; 244/17.11, 17.27; 52/167.1, 167.9; 248/550, 566

(56) References Cited

U.S. PATENT DOCUMENTS

| | | | | |
|---|---|---|---|---|
| 5,219,051 A | * | 6/1993 | Davis ........................ | 188/378 |
| 5,558,191 A | * | 9/1996 | Lai ............................ | 188/379 |
| 5,775,472 A | | 7/1998 | Osterberg et al. .......... | 188/378 |
| 5,816,373 A | | 10/1998 | Osterberg et al. .......... | 188/380 |
| 5,873,438 A | | 2/1999 | Osterberg et al. .......... | 188/379 |

* cited by examiner

Primary Examiner—Christopher P. Schwartz

(57) ABSTRACT

A tuned mass damper includes a container having first and second inside wall portions, and a proof mass disposed within the container. Multiple pairs of oppositely directed bellows containing damping fluid are connected between the wall portions and the mass to permit motion of the mass along primary axes. A spring is connected in series with each pair of bellows. The spring has a diameter substantially less than a diameter of the corresponding pair of bellows so that the spring and bellows allow translational movement of the mass about an axis other than the primary axes.

18 Claims, 4 Drawing Sheets

TUNED MASS DAMPER WITH TRANSLATIONAL AXIS DAMPING

BACKGROUND OF THE INVENTION

The present invention generally relates to damping devices and, more particularly, relates to a tuned mass damper for damping oscillations and vibrations which occur in structures, such as those found on spacecraft satellites.

Certain types of structures oscillate when subjected to vibratory excitations. Examples of vibration excitable structures include reflectors, solar arrays, and booms for carrying equipment, all of which are commonly found on spacecraft satellites which are subjected to thermal shocks and other vibratory excitations that may cause the structure to vibrate at a predetermined frequency. Vibratory oscillations of these and other structures can cause inaccuracy in equipment associated therewith and, thus, it is desirable to damp vibrations in certain structures.

Conventional tuned mass dampers generally employs a spring positioned proof mass mounted in a container of damping fluid. The spring stiffness and the mass are chosen to have substantially the same frequency of oscillation of the structure and damper device combination so that, upon oscillation, the vibrating structure provides an input to the damper. Due to the damper arrangement, the mass vibrates one hundred eighty degrees (180°) out of phase with the vibrating structure. As a consequence, the tuned mass damper essentially absorbs a substantial portion of the energy of the vibrating structure and cancels the structure motion at the predetermined frequency so that the tuned mass damper and structure begin to vibrate at two slightly different off-resonant frequencies. As a consequence of the resultant damping, the displacement of the vibrating structure is substantially reduced.

Many conventional tuned mass dampers employ a proof mass that is limited to damping vibrations in a single axis. One approach to providing multiple-axes damping is disclosed in U.S. Pat. No. 5,775,472, entitled "MULTI-AXIS TUNED MASS DAMPER," the disclosure of which is hereby incorporated herein by reference. The aforementioned approach employs a single mass mounted for motion in two or three axes and supported by springs chosen to provide a frequency of vibration in each axis. In each orthogonal axis, a pair of oppositely directed expandable bellows containing a damping fluid are connected between wall portions of a generally cylindrical cup-shaped housing and the mass to permit motion of the mass along the designated axis. While multiple pairs of bellows and springs are arranged to achieve damping in multiple orthogonal axes, the spring and bellows design of the above-described tuned mass damper offers limited translational movement of the mass.

It is therefore desirable to provide for a tuned mass damper which permits large translational deflections of the proof mass. In particular, it is desirable to provide for a multi-axes tuned mass damper which allows extended movement of the mass in directions transverse to the individual primary orthogonal damping axes.

SUMMARY OF THE INVENTION

The present invention provides for a multiple axes tuned mass damper which permits extended transverse movement of a proof mass. The tuned mass damper includes a container having inner walls and a mass disposed within the container. The damper has a first pair of oppositely directed fluid containment assemblies each including a cup-shaped containment member and an expandable bellows connected to the mass to define a fluid chamber containing a damping fluid. The first pair of oppositely directed fluid containment assemblies permit motion of the mass along a first axis. The damper also has a second pair of oppositely directed fluid containment assemblies each including a cup-shaped containment member and an expandable bellows connected to the mass to define a fluid chamber containing a damping fluid. The second pair of oppositely directed fluid containment assemblies permits motion of the mass along a second axis. First and second springs bias the first pair of fluid containment assemblies between opposite inner walls of the container. The first and second springs each have an outside diameter less than an inside diameter of the cup-shaped containment members to allow translational deflection of the mass about an axis other than the first axis. Third and fourth springs bias the second pair of fluid containment assemblies between opposite inner walls of the container. The third and fourth springs each have an outside diameter less than an inside diameter of the cup-shaped containment members to allow translational deflection of the mass about an axis other than the second axis.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
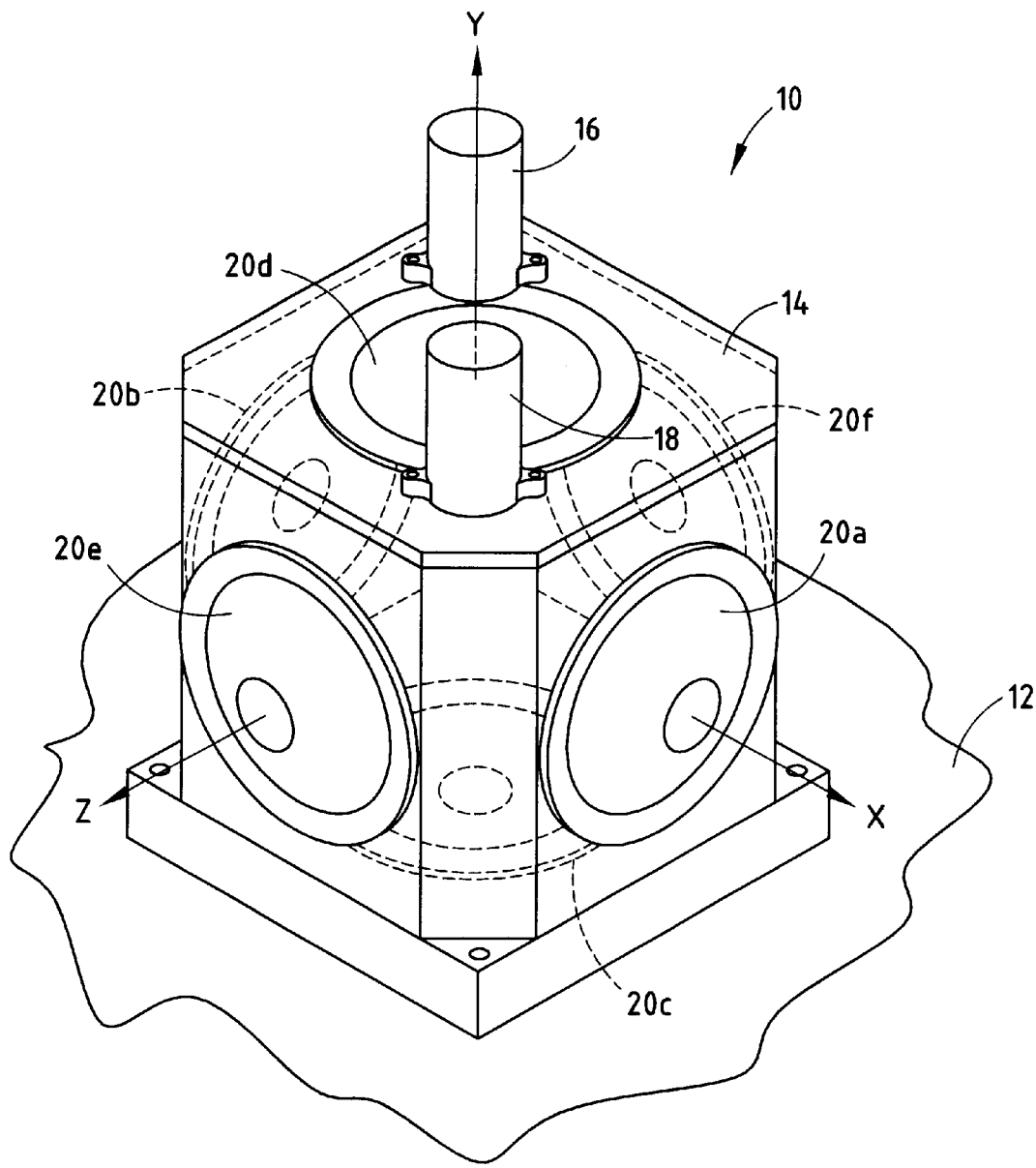
FIG. 1 is a perspective view of a three-axis tuned mass damper mounted on a spacecraft boom according to the present invention.
Figure 2:
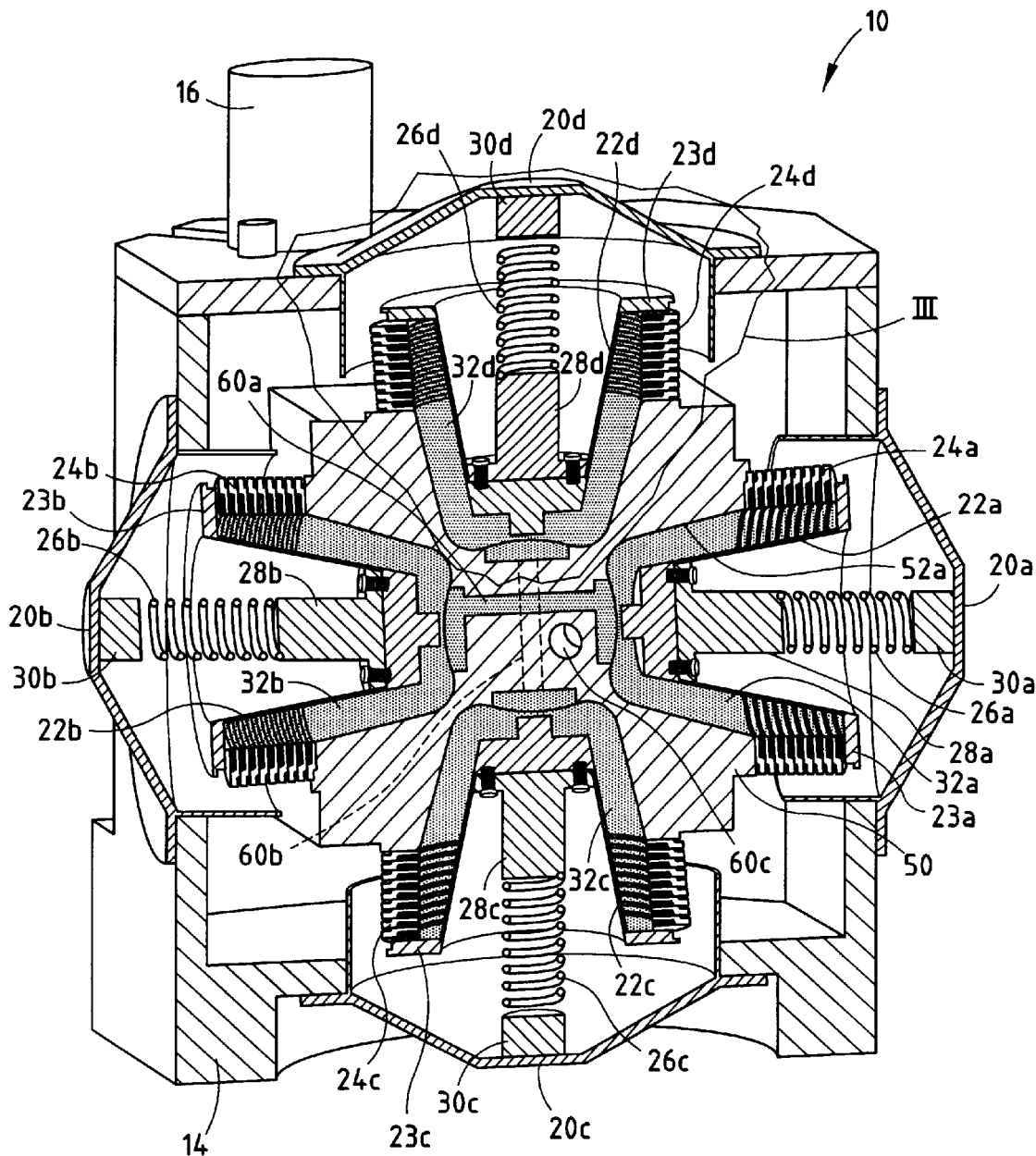
FIG. 2 is a cross-sectional view of the tuned mass damper shown in FIG. 1 taken through the X-Y plane.

Referring to FIGS. 1 and 2, a three-axes tuned mass damper is generally shown designated by reference numeral 10. The tuned mass damper 10 is shown mounted to a structure, such as a large boom assembly 12 on a satellite spacecraft. The spacecraft boom assembly 12 may tend to oscillate when subjected to shock or other vibratory excitations. The tuned mass damper 10 is mounted to the boom assembly 12 and oriented to damp a substantial portion of the energy of the boom assembly 12 to thereby reduce the vibratory motion of the boom assembly 12.

The tuned mass damper 10 includes a generally cubical housing 14 having six outwardly protruding caps 20a–20f provided in each of the six respective side walls. The housing 14 may alternately be configured in various other shapes. Each of caps 20a–20f covers the end portion of one of six corresponding spring-biased fluid containment assemblies having expandable bellows and cup-shaped containment members which are spring-biased against inner walls of the cups 20a–20f and oriented to provide vibration damping about three primary axes, namely the orthogonal X-axis, Y-axis, and Z-axis. Also shown positioned on top of the tuned mass damper 10 are a pair of Frangibolt™ or equivalent launch locks 16 and 18 which may be used to rigidly support the tuned mass damper proof mass 50 during spacecraft launch.

The tuned mass damper 10 is shown in FIG. 2 taken through a central cross section along the X-Y plane. The tuned mass damper 10 includes a movable proof mass 50 suspended substantially centrally within housing 14. Proof mass 50 is an inertial mass that may include Tungsten, for example. A first pair of spring-biased cup-shaped fluid containment members 22a and 22b each having a conical section are located on opposite sides of mass 50 aligned in the X-axis. A second pair of spring-biased cup-shaped fluid containment members 22c and 22d each having a conical section are aligned in the Y-axis, and positioned on opposite sides of the proof mass 50. Fluid containment members 22a and 22b are sealingly connected to the mass 50 by way of expandable bellows 24a and 24b which together form damping fluid chambers 32a and 32b, respectively. Likewise, fluid containment members 22c and 22d are sealingly connected to proof mass 50 by way of expandable bellows 24c and 24d to form damping fluid chambers 32c and 32d, respectively. It should be appreciated that the tuned mass damper 10 further includes a third pair of spring-biased cup-shaped fluid containment members (not shown) each having a conical section and disposed on opposite sides of proof mass 50 and aligned in the Z-axis for providing damping about the Z-axis.

The cup-shaped fluid containment members 22a–22d each have a conical section extending outward to a lip 23 spaced at a predetermined distance from the interior wall of housing 14. The fluid chambers 32a–32d defined by the fluid containment members 22a–22d, bellows 24a–24d, and mass 50 contain damping fluid. The expandable bellows 24a–24d expand and contract to allow the cup-shaped fluid containment members 22a–22d to translate along the primary X-axis and Y-axis. The fluid chambers 32a–32d are filled with a damping fluid that is selected based on the damping frequency characteristics. Proof mass 50 has three individual passages 60a, 60b, and 60c extending therethrough. Passage 60a allows damping fluid to flow between fluid chambers 32a and 32b. Passage 60b allows damping fluid to flow between fluid chambers 32c and 32d. Passage 60c allows fluid to flow between the remaining two fluid chambers (not shown) aligned in the Z-axis.

Springs 26a–26d are shown as helical coil springs connected at opposite ends to connectors, including outer connectors 30a–30d and inner connectors 28a–28d, respectively. Outer connectors 30a–30d abut against the inner walls of the outer caps 20a–20d, respectively.

The inner connectors 28a–28d are fixed in place to the respective cup-shaped fluid containment members 22a–22d. The springs 26a–26d are centrally located within the conical section opening in the cup-shaped containment members 22a–22d and are spaced from the inner walls of members 22a–22d. Thus, the springs 26a–26d and containment members 22a–22d are configured to allow substantial transverse movement of the fluid containment members 22a–22d such that the mass 50 is able to move extensively in multiple directions.

Figure 3:
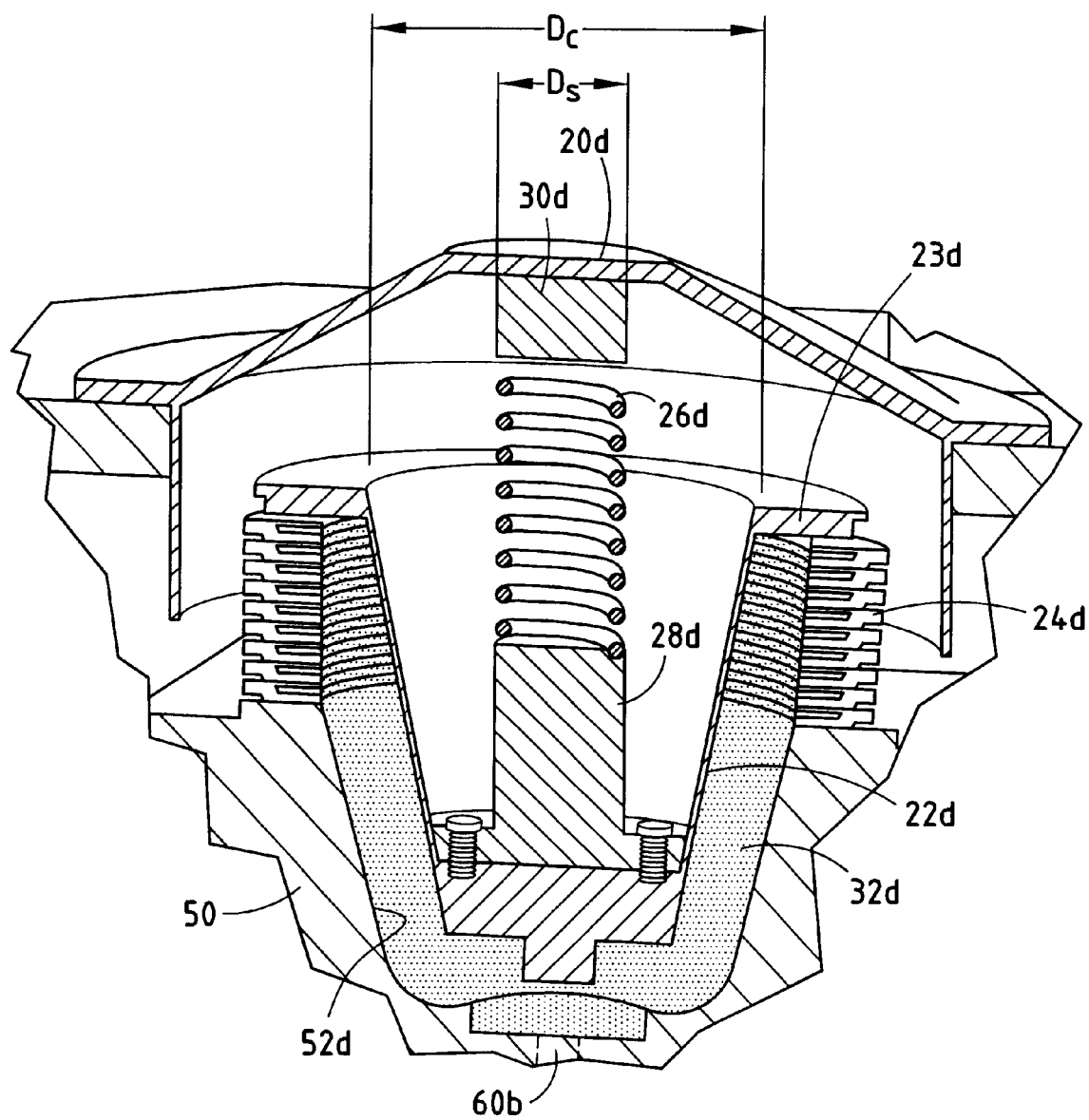
FIG. 3 is an enlarged view of section III of FIG. 2.

Referring to FIG. 3, an enlarged portion of the tuned mass damper 10 is further illustrated which further shows one of the fluid containment assemblies including spring-biased cup-shaped fluid containment member 22d and expandable bellows 24d connected to proof mass 50 to define the damping fluid chamber 32d. The helical coil spring 26d has an outside diameter $D_s$ substantially smaller than the inside diameter $D_c$ of the cup-shaped fluid containment member 22d taken at lip 23d. By placing the spring 25d inside the central conical section of cup-shaped containment member 22d and spacing the spring 26d a sufficient distance from member 22d, the spring 26d is allowed to bend sideways without interference with containment member 22d so that member 22d can move transversely. As the mass 50 moves in the horizontal direction about the X-axis, the vertical bellows 24c and 24d are distorted to the left and right and spring 26d bends so as to allow for large transverse movement of the cup-shaped containment member 22d without interference from spring 26d.

By configuring the bias spring 26d with an outer diameter $D_s$ substantially less than the inside diameter $D_c$ of the containment member 22d, the spring-biased containment member 22d is allowed to move a substantial distance transverse to the primary Y-axis. During transverse movement, the spring 26d bends laterally, while the expandable bellows 24d expands and deforms laterally to allow for the transverse motion. The amount of transverse movement may be selected as a function of the lateral stiffness of the spring 26d, effective length of the spring 26d, and lateral stiffness of the expandable bellows 24d. Thus, the tuned mass damper 10 of the present invention advantageously provides for damping while allowing extended movement transverse to the primary X-axis and Y-axis.

The tuned mass damper 10 is configured to damp oscillations primarily at predetermined frequencies. According to one embodiment, tuned mass damper 10 may be configured to provide different predetermined frequency responses along each of the X-axis, Y-axis, and Z-axis. Alternatively, the frequency response in two or all three of the X-axis, Y-axis, and Z-axis may be identical. It should be appreciated that in order to tune the tuned mass damper 10 to a predetermined frequency, the mass 50, length and stiffness of bias springs 26a–26d, stiffness of the expandable bellows 24a–24d, and damping fluids are chosen to achieve the predetermined frequency. Additionally, the lateral stiffness of the expandable bellows 24a–24d and springs 26a–26d that move in the transverse direction should also be taken into consideration. While the tuned mass damper 10 is shown in FIG. 2 and described in connection with two orthogonal pairs of spring-biased fluid containment assemblies for damping vibrations in two orthogonal axes, it should be appreciated that the present invention applies to both two-axes and three-axes damping.

Figure 4:
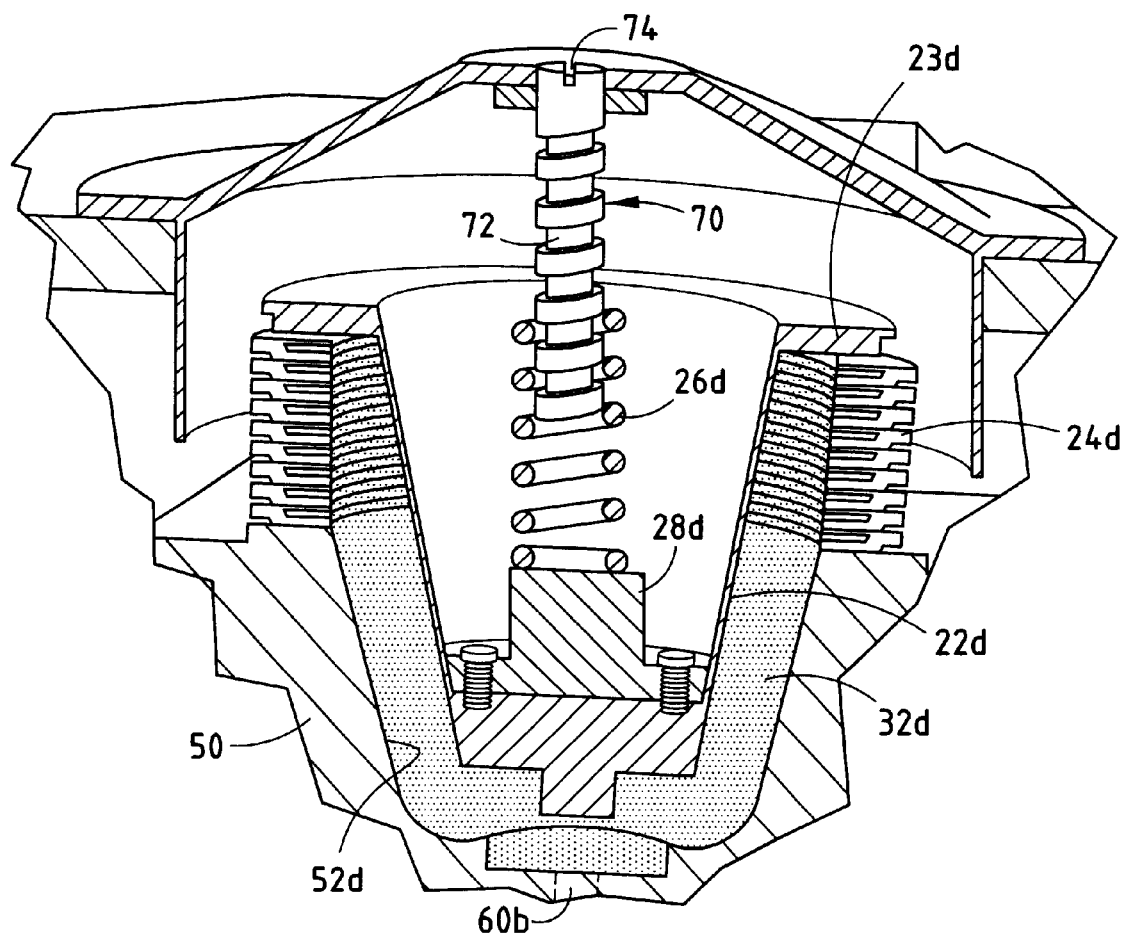
FIG. 4 is an alternative cross-sectional view of section III of FIG. 2 showing the addition of an adjustable tuning screw for adjusting the stiffness of the spring.

The tuned mass damper 10 may further be configured to include an adjustable tuning screw 70 as shown in FIG. 4, according to another embodiment. The adjustable tuning screw 70 is threaded to include a helical channel 72 for engaging the inner surface of spring 26d. The effective length of spring 26d can be varied by turning screw 70 via screw head 74 to move the turning screw 70 inward or outward. In effect, the effective length of the spring 26d extends the distance from the end of the tuning screw 70 to inner connector 28d. This enables the frequency response of the tuned mass damper 10 to be adjusted simply by turning the adjustable tuning screw 70 coupled to the cup-shaped fluid containment member 22d to adjust the number of turns of spring 26d that provide bias. Once the tuned mass damper 10 has been tuned and mounted on the desired structure, such as a boom on a spacecraft, vibrations of the structure in the X-axis, Y-axis, and Z-axis direction will be countered by one hundred eighty degrees (180°) out of phase motion of the mass 50, thus extracting energy from the boom motion and causing the boom and damper 10 to oscillate at two slightly different frequencies. Since the tuned mass damper 10 has absorbed a substantial portion of the energy, the boom displacement becomes much smaller and effectively is damped out by the damping fluid.

Accordingly, the tuned mass damper 10 of the present invention provides for a multiple axes damper which effectively damps vibrations of the structure to which it is attached along the primary axes and further allows for extended transverse movement of the mass 50 and fluid containment assemblies. The tuned mass damper 10 allows for transverse motion of the expandable bellows 24a–24d and proof mass 50 such that the motion is not limited severely by the arrangement of the spring-biased fluid containment members and bellows. It should be appreciated that the present invention allows for damping of vibrations about at least two or more axes.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A tuned mass damper comprising:
   a container having inner walls;
   a mass disposed within the container;
   a first pair of oppositely directed fluid containment assemblies each comprising a cup-shaped member and an expandable bellows connected to the mass to define a fluid chamber containing a damping fluid, the first pair of oppositely directed fluid containment assemblies permitting motion of the mass along a first axis;
   a second pair of oppositely directed fluid containment assemblies each comprising a cup-shaped member and an expandable bellows connected to the mass to define a fluid chamber containing a damping fluid, the second pair of oppositely directed fluid containment assemblies permitting motion of the mass along a second axis;
   first and second springs connected in series with the first pair of fluid containment assemblies for biasing the first pair of containment assemblies between opposite inner walls of the container, the first and second springs each having an outside diameter less than an inside diameter of the cup-shaped members to allow translational deflection of the mass about an axis other than the first axis; and
   third and fourth springs connected in series with the second pair of fluid containment assemblies for biasing the second pair of containment assemblies between opposite inner walls of the container, the third and fourth springs each having an outside diameter less than an inside diameter of the cup-shaped members to allow translational deflection of the mass about an axis other than the second axis.

2. The tuned mass damper as defined in claim 1, wherein each of the first, second, third, and fourth springs each has an outer diameter substantially less than the inside diameter of the cup-shaped members.

3. The tuned mass damper as defined in claim 1, wherein each of the first, second, third, and fourth springs are disposed within recesses provided in the cup-shaped members.

4. The tuned mass damper as defined in claim 1, wherein the mass has a first channel extending between the first pair of oppositely directed fluid containment assemblies for allowing damping fluid to pass between fluid chambers, and a second channel extending between the second pair of oppositely directed fluid containment assemblies for allowing damping fluid to pass between fluid chambers.

5. The tuned mass damper as defined in claim 1, wherein the cup-shaped members each comprise a conical section.

6. The tuned mass damper as defined in claim 1 further comprising an adjustable tuning screw connected to one of said springs to allow adjustment of the spring constant.

7. The tuned mass damper as defined in claim 1, wherein the damper is mounted on a spacecraft.

8. A tuned mass damper comprising:
   a container having first, second, third, and fourth inner walls;
   a mass disposed within the container;
   a first pair of oppositely directed fluid containment assemblies each comprising a cup-shaped member and an expandable bellows connected to the mass to define a fluid chamber containing a damping fluid, the first pair of oppositely directed fluid containment assemblies permitting motion of the mass along a first axis;
   a second pair of oppositely directed fluid containment assemblies each comprising a cup-shaped member and an expandable bellows connected to the mass to define a fluid chamber containing a damping fluid, the second pair of oppositely directed fluid containment assemblies permitting motion of the mass along a second axis;
   first and second springs connected in series with the first pair of fluid containment assemblies for biasing the first pair of containment assemblies between the first and second inner walls of the container, the first and second springs each having an outside diameter substantially less than an inside diameter of the cup-shaped members to allow translational deflection of the mass about an axis other than the first axis; and
   third and fourth springs connected in series with the second pair of fluid containment assemblies for biasing the second pair of containment assemblies between the third and fourth inner walls of the container, the third and fourth springs each having an outside diameter substantially less than an inside diameter of the cup-shaped members to allow translational deflection of the mass about an axis other than the second axis.

9. The tuned mass damper as defined in claim 8, wherein the mass has a first channel extending between the first pair of oppositely directed fluid containment assemblies for allowing damping fluid to pass between fluid chambers, and a second channel extending between the second pair of oppositely directed fluid containment assemblies for allowing damping fluid to pass between fluid chambers.

10. The tuned mass damper as defined in claim 8, wherein the cup-shaped members each comprise a conical section.

11. The tuned mass damper as defined in claim 8 further comprising an adjustable tuning screw connected to one of said springs to allow adjustment of the spring constant.

12. The tuned mass damper as defined in claim 8, wherein the damper is mounted on a spacecraft.

13. A tuned mass damper comprising:
   a container having first and second inner walls;
   a mass disposed within the container;
   a first fluid containment assembly comprising a first bellows and a first cup-shaped member connected to the mass to define a first fluid chamber containing a damping fluid;
   a second fluid containment assembly comprising a second bellows and a second cup-shaped member connected to the mass to define a second fluid chamber containing a damping fluid, the first and second fluid containment assemblies permitting, motion of the mass along a first axis; and a first spring connected in series between the first inner wall of the container and the first cup-shaped member, said first spring having an outer diameter less than an inner diameter of the first cup-shaped member so that the first spring and first bellows allow translational deflection of the mass about an axis other than the first axis.

14. The tuned mass damper as defined in claim 13 further comprising a second spring connected in series between the second inner wall of the container and the second cup-shaped member, said second spring having an outer diameter less than an inner diameter of the second cup-shaped member so that the second spring and second bellows allow translational deflection of the mass about an axis other than the first axis.

15. The tuned mass damper as defined in claim 13, wherein the first and second cup-shaped members each includes a conical section.

16. The tuned mass damper as defined in claim 13, wherein the mass has a channel extending between the first and second fluid chambers for allowing damping fluid to pass therethrough.

17. The tuned mass damper as defined in claim 13 further comprising an adjustable tuning screw connected to the first spring to allow adjustment of the spring constant.

18. The tuned mass damper as defined in claim 13, wherein the damper is mounted on a spacecraft.

* * * * *